April 30, 1946.  C. G. TAGO  2,399,257

JIG

Filed March 12, 1945

INVENTOR.
CATALINO G. TAGO
BY Ralph L. Chappell
ATTORNEY

Patented Apr. 30, 1946

2,399,257

UNITED STATES PATENT OFFICE 2,399,257

JIG

Catalino G. Tago, New York, N. Y.

Application March 12, 1945, Serial No. 582,373

4 Claims. (Cl. 77—62)

(Granted under the act of March 3, 1883, as amended April 30, 1928; 370 O. G. 757)

This invention relates to a jig for positioning the drill and sister hooks for the pin hole drilling operation in the making of sister hooks.

An object of this invention is a jig for positioning a pair of sister hooks and the drill bit in proper relationship during the pin hole drilling operation.

Another object of this invention is a jig for positioning the sister hooks and drill properly when the sister hook forgings may have variations or irregularities.

Further objects and advantages of this invention, as well as its construction, arrangement and operation, will be apparent from the following description and claims in connection with the accompanying drawing, in which, Figure 1 is a plan view of the jig, a portion being broken away for clarity of illustration.

Figure 1:
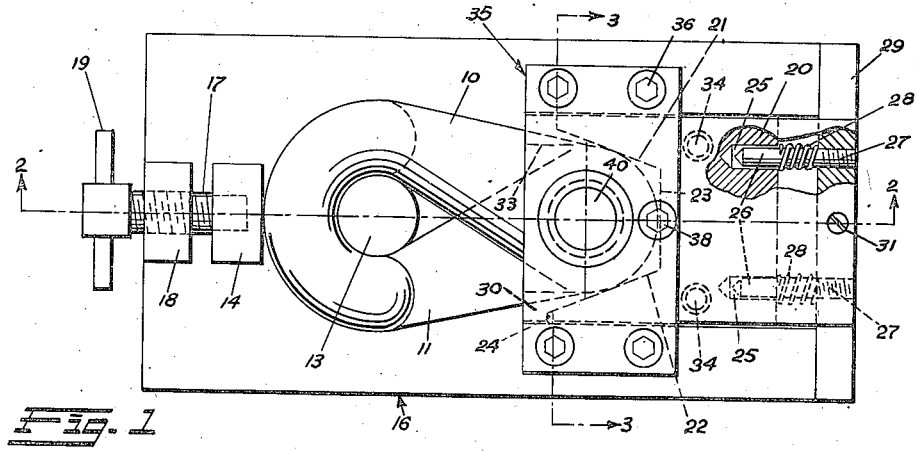

Referring to the drawing in detail, Figure 1 shows an embodiment of the invention wherein sister hooks 10—11 are shown in the jig in position for the drilling of the pin hole 12.

The sister hooks 10—11 are held in position by means of a centering pin 13, and an adjustable screw block 14. The pin 13 has a collar 15, and is removably mounted in base member 16. The adjustable screw block 16 is moved to and from the sister hooks 10—11 by means of a threaded spindle 17 mounted in pillar 18. Spindle 17 has a handle 19 for manual operation.

Figure 2:
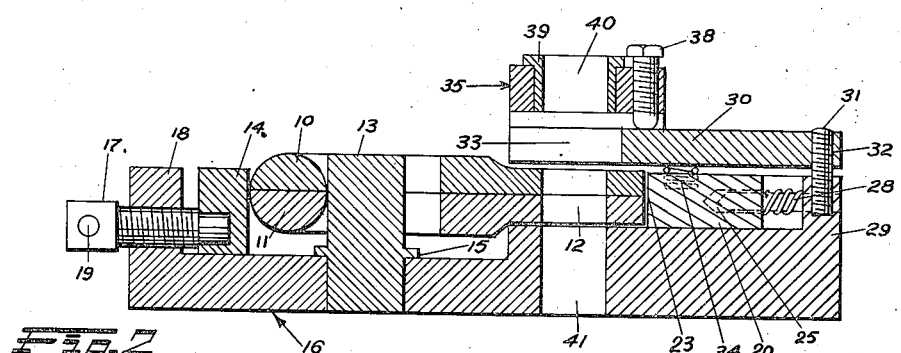
Figure 2 is a central vertical section along the line 2—2 of Figure 1.
Figure 3:
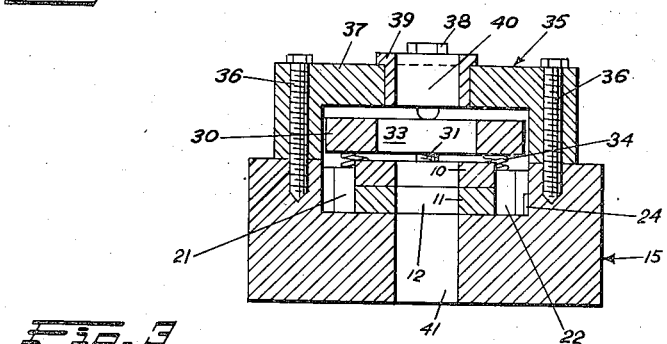
Figure 3 is a transverse vertical section along the line 3—3 of Figure 1.
Figure 4:
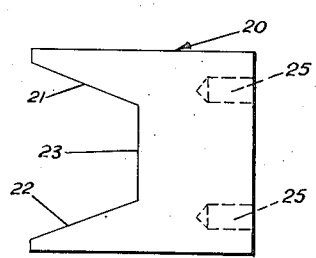
Figure 4 is a plan view of the positioning block.

While pin 13 and block 14 hold the sister hooks 10—11 generally in position, more exact centering of the sister hooks is achieved by means of a flexibly mounted positioning block 20, having sloping sides 21 and 22 and a side 23 generally transverse to the longitudinal axis of the jig. Movement of the positioning block 20 to the left as viewed in Figures 1 and 2 is limited by a stop pin 24.

In the right side of block 20 are located two bores 25 which receive threaded guide pins 26. Pins 26 mount coil springs 28 and are threadedly mounted in wall 29. The threaded ends of pins 26 are designated by the numerals 27—27.

It can be seen from the above that when a pair of sister hooks are placed in the jig the sloping sides 21 and 22 of block 20 will accurately position the work and that the block 20, itself, will yield sufficiently to allow proper positioning of the work.

The work is held in position from above by means of holding down clamp 30 loosely attached to wall 29 by means of heel screw 31 which passes through bore 32 and which is threadedly received in wall 29.

The left end of holding down clamp 30 as viewed in Figures 1 and 2 has a horse shoe shaped recess 33 to allow passage of the drill bit. Holding down clamp 30 is spaced from positioning block 20 by means of coil springs 34 mounted in block 20

Positioning block 20 and holding down clamp 30 both have their left ends, as viewed in Figures 1 and 2, located beneath yoke 35 which is fastened to the base member 15 by means of threaded studs 36.

Within the top member 37 of yoke 35 is mounted thumb screw 38, the extremity of which bears on holding down clamp 30 to regulate the pressure on the work.

In the top member 37 of yoke 35 is also mounted drill bushing 39, having a bore 40 into which is inserted the drill bit.

In the operation of the invention when pin hole 12 of the sister hooks is to be drilled, the drill bit will enter bore 40 of the drill bushing, pass through recess 33 of the holding down clamp, and into bore 41 in the base 16.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A jig for positioning a pair of sister hooks for the pin hole drilling operation, comprising a resiliently mounted positioning block for positioning one end of said pair of sister hooks, a clamping device for holding the other end of said pair of sister hooks, a holding down clamp mounted above said positioning block, and means to vary pressure on said holding down clamp.

2. A jig for positioning a pair of sister hooks for the pin hole drilling operation, comprising a base, a removable pin mounted in said base, a clamping device on said base for clamping said sister hooks between said clamping device and said pin, a positioning block on said base, a resilient mounting for said block, a holding down clamp above said block, said holding down clamp having a recess, a support on said base, said support extending above said holding down clamp, and a drill guide on said support, said drill guide and said recess being aligned.

3. A jig for the pin hole drilling operation in the mannufacture of sister hooks, comprising a base, a clamp and pin on said base between which the sister hooks are held in position, a positioning block for positioning the sister hooks, said positioning block being resiliently mounted, a holding down clamp flexibly mounted on said base above said positioning block, said holding down clamp having a recess, means to vary pressure on said holding down clamp, a guide for a drill bit mounted above said base, a bore in said base, said guide, said recess, and said bore being so arranged as to permit passage of a drill bit.

4. A jig for positioning a pair of sister hooks and the drill used in the drilling of a pin hole in said sister hooks, comprising a base member, a pillar mounted on the said base member, a clamping block movably mounted on said pillar for clamping a pair of sister hooks between said block and a centering pin, a centering pin removably mounted in said base for entry in the open space between the sister hooks, a positioning block mounted on said base member, said positioning block having inclined sides to receive and center the pair of sister hooks, a wall mounted on said base member, guide pins mounted in said wall, bores extending into said positioning block, said guide pins extending into said bores, springs mounted on said guide pins and located between said wall and said positioning block, a holding down clamp flexibly mounted on said wall above said positioning block, a yoke mounted on said base member and extending over said positioning block and said holding down clamp, a thumb screw extending through the top of said yoke for regulating pressure on said holding down clamp, and a drill bushing extending through the top of said yoke.

CATALINO G. TAGO.